Feb. 26, 1929.
H. W. SANFORD
AUTOMOBILE SHOCK CONTROL
Filed July 3, 1924
1,703,323
3 Sheets-Sheet 1
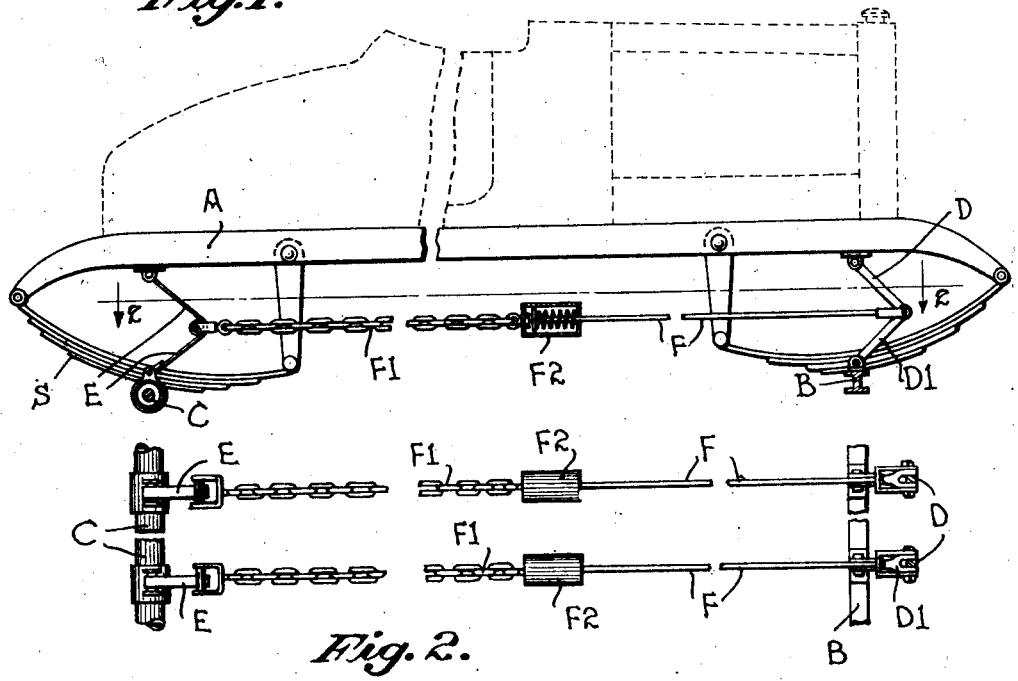
Fig. 1.
Fig. 2.
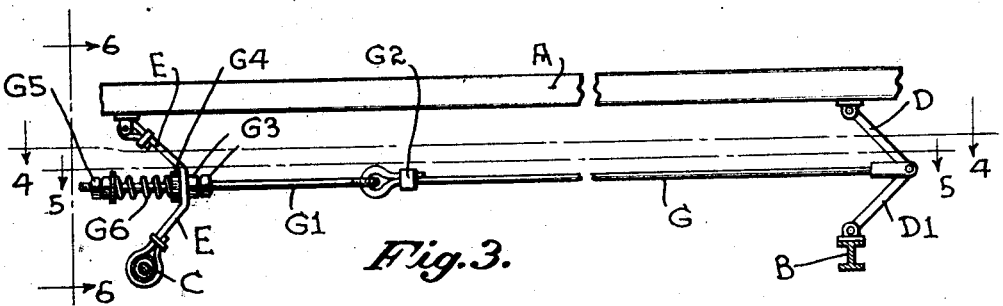
Fig. 3.
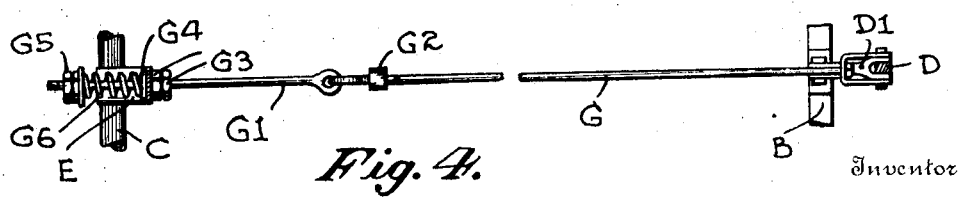
Fig. 4.
Witnesses
Inventor
Hugh W. Sanford
By Cyrus Kehr
Attorney

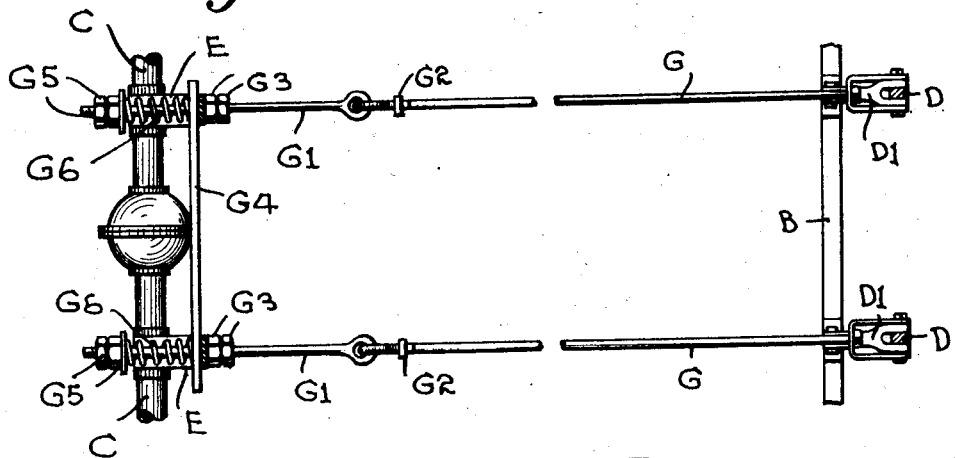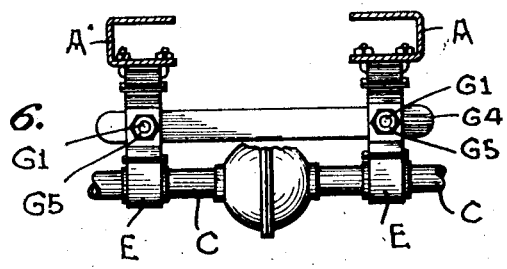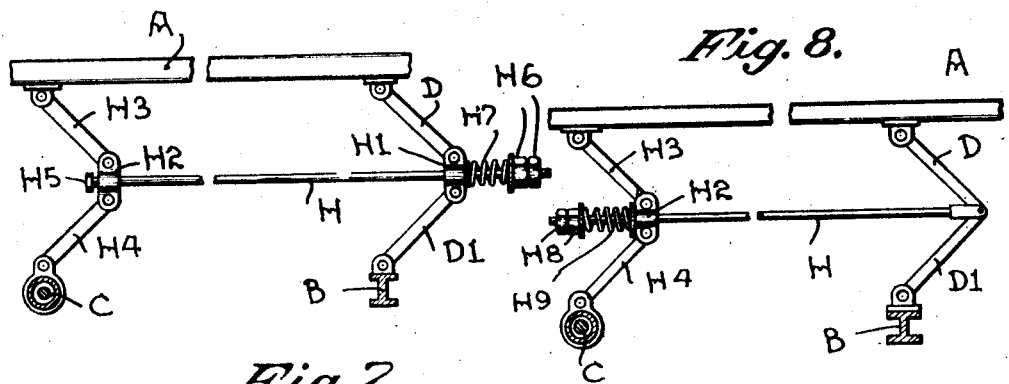

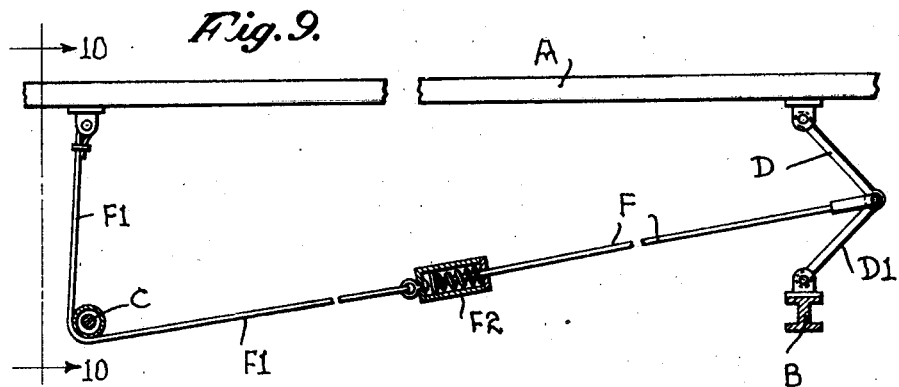
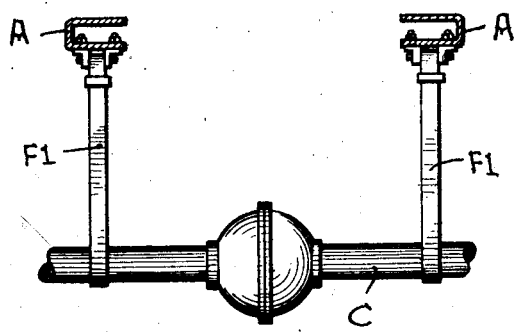
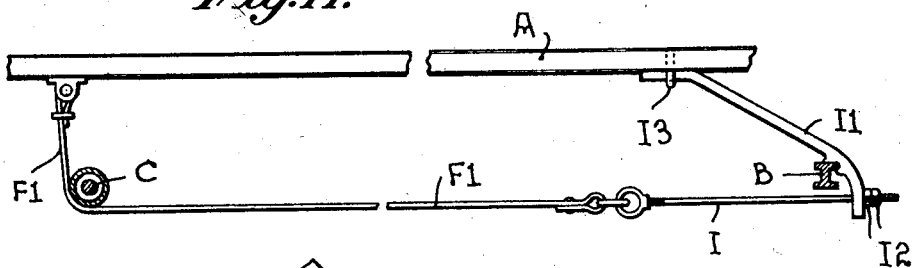
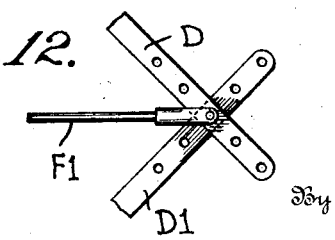

Patented Feb. 26, 1929.

1,703,323

UNITED STATES PATENT OFFICE.

HUGH W. SANFORD, OF KNOXVILLE, TENNESSEE.

AUTOMOBILE SHOCK CONTROL.

Application filed July 3, 1924. Serial No. 724,168.

My improvement relates generally to means for controlling the up and down movement of the body of an automobile or similar vehicle in response to strains exerted upon the body when the wheels of the vehicle pass over irregularities in the road surface. The action of my apparatus is chiefly concerned with the control or retarding of rebound of the automobile body when the wheels of the automobile pass depressions or elevations, whereby the body-supporting springs are compressed and subsequent recoil of the springs tends to cause rapid upward movement or "rebound" of the body.

In the accompanying drawings,

Fig. 1 is a sectional elevation showing my improved mechanism applied to the axles and body of an automobile;

Fig. 2 is a horizontal section on the line, 2—2, of Fig. 1;

Fig. 3 is a view similar to Fig. 1, portions being broken away;

Fig. 4 is a horizontal section on the line, 4—4, of Fig. 3;

Fig. 5 is a horizontal section on the line, 5—5, of Fig. 3, the rear straps being connected by a horizontal bar;

Fig. 6 is an upright section on the line, 6—6, of Fig. 3, looking toward the right;

Fig. 7 illustrates a form in which rigid links are used at each end of the mechanism and a cushioning spring is used at the forward end;

Fig. 8 is similar to Fig. 7, the cushioning spring being applied at the rear end of the mechanism;

Fig. 9 illustrates the mechanism in another form;

Fig. 10 is an upright section on the line, 10—10, of Fig. 9, looking toward the right;

Fig. 11 illustrates another form of the mechanism;

Fig. 12 is a detail view of the forward toggles.

Referring first to Figs. 1 and 2, A designates the chassis or frame of an automobile, such as is used in automobiles of various makes. B is the front axle and C is the rear axle. S, S are ordinary blade springs for supporting the chassis on the axles. Between the front axle and the forward part of the chassis is a toggle composed of the upper rigid link, D, and the lower rigid link, $D^1$, the upper end of the link, D, being coupled to the chassis and the lower end of said link being coupled to the lower end of the lower link, $D^1$, while the lower end of the link, $D^1$, is coupled to the front axle, B. A rope, strap or chain, E, has its upper end connected to the chassis while its lower end is connected to the axle, C. Said member, E, is approximately as long as the combined lengths of the toggle members, D, and $D^1$, in order that the middle portion of the member, E, may be directed toward the toggle and form an angle similar, but not necessarily equal, to the angle of the toggle when the rear end of the chassis is in its normal or middle position, such position being the ordinary position intermediate the extreme lower position and the extreme position attained, respectively, during the compression of the rear springs and during the subsequent re-expansion of the rear springs.

From the middle joint of the toggle, D, $D^1$, a tension member composed of the forward section, F, and a rear section, $F^1$, and a cushioning spring section, $F^2$, the rear end of the section, $F^1$, being joined to the middle of the rope, strap or chain, E. The toggle, D, $D^1$, and the member, E, and the tension member are preferably so proportioned as to put the tension member under some tension when the rear end of the chassis is in normal position. These several parts are so related as to make it impossible for the rear end of the chassis to rise appreciably above normal without exerting tension through the tension member, F, $F^1$, to tend to straighten the toggle, D, $D^1$, and raise the forward end of the chassis. Thus the weight and inertia of the forward end of the chassis and the forward end of the automobile body tend to resist the upward rebound of the rear end of the chassis and the automobile body.

The cushioning spring member, $F^2$, is placed between the parts, F and $F^1$, of the tension member to adapt the tension member to yield endwise in a resilient manner, in order that the transmission of strains may be graduated or made less abrupt. When not needed for this purpose, this spring may be omitted.

By reference to Fig. 2, it will be seen that this mechanism is duplex, there being two toggles and two tension members and two strap members, E, whereby engagement is made between each side of the chassis and the axles.

In the form shown by Figs. 3, 4, 5 and 6, the structure is the same as in Figs. 1 and 2, excepting that the compression spring member is differently applied and provision is made for adjusting the engagement of the tension member with the member, E, which in this case is a broad strap. The tension member consists of a rope, G, and an eye bolt, $G^1$, which is coupled to the rope and extends rearward through the strap, E. The rope, G, is looped through the eye of the eye bolt, $G^1$, and the end of said rope is secured to the body of the rope by means of a clamp, $G^2$. The eye bolt is screw-threaded from near its eye to its rear end. A pair of jam nuts, $G^3$, surround said bolt immediately in front of the strap member, E. At the opposite side of said strap is a seating member, $G^4$. On the outer end of said bolt are a pair of jam nuts, $G^5$. Between the nuts, $G^5$, and the seating member, $G^4$, is a contracting or cushioning spring, $G^6$, which bears against the nuts, $G^5$, and against the seating member, $G^4$, and tends to effectively force the eye bolt rearward. By appropriately shifting the nuts, $G^5$ and $G^3$, on the eye bolt, the resistance offered by the spring, $G^6$, may be varied and the relation between the strap member, E, and the toggle, D, $D^1$, through the tension member may be varied.

In the form shown by Fig. 4, only a single strap member and a single toggle and a single tension member are used. In Figs. 5 and 6, these members are shown duplex, engagement being made at each side of the chassis; and the seating member, $G^4$, is made a bar extending from one eye bolt to the other.

The chief purpose of the adjustment which may be made by shifting the nuts, $G^5$ and $G^3$, is to facilitate adapting the mechanism to the particular automobile to which the mechanism is applied. Ordinarily when suitable adjustment has been found by trial, that adjustment may continue unless there is weakening of the cushioning spring or a stretching of the tension member, whereby the previous relation of the parts is changed.

In Fig. 7, the tension member is a rigid and continuous rod, H, extending slidably through the toggle block, $H^1$, and through the block, $H^2$, at the rear of the mechanism, a rigid link, $H^3$, being coupled to said block and the rear part of the chassis or body, and a link, $H^4$, being coupled to said block and the rear axle. On the rear end of the rod, H, is a head, $H^5$. On the forward end of said rod are threaded a pair of jam nuts, $H^6$. Between said nuts and the toggle block, $H^1$, is a cushioning spring, $H^7$. During downward movement of the rear part of the body and chassis, the links, $H^3$ and $H^4$ and the block, $H^5$, are folded, said block sliding forward on the rod, H, or said rod sliding forward in the toggle block, $H^1$. When the body is in upward motion above its normal position, the links, $H^3$ and $H^4$, and the block, $H^2$, will be drawn toward upright position, whereby the block, $H^2$, is made to draw the rod, H, rearward, whereby the toggle at the front of the mechanism is moved toward upright or straight position, which involves the raising of the front end of the body and chassis.

In Fig. 8, the structure is the same as in Fig. 7, excepting that the forward end of the rod, H, is coupled to the toggle as in Fig. 1, while the head, $H^5$, is omitted from the rear end of the rod and the rod is extended rearward and threaded to receive jam nuts, $H^8$, and a cushioning spring, $H^9$, is placed between said nuts and the block, $H^2$.

In Fig. 9, the forward part of the mechanism is the same as in Fig. 1; but the member, E, is omitted and the part, $F^1$, of the tension member is extended rearward under and against the axle, C, and thence upward to the chassis, said end being suitably joined or coupled to the chassis. For upward rebound, the chassis must pull the tension member, $F^1$, upward and rearward around the axle, whereby the part, F, of the tension member is drawn rearward and the toggle partially straightened, whereby the forward end of the chassis and the automobile body are lifted. Fig. 10 shows this mechanism in duplex form, engagement being made at the two sides of the chassis.

In Fig. 11, the part, $F^1$, of the tension member is applied as in Figs. 9 and 10. The forward end of said member is coupled to the eye of an eye bolt, I, which extends forward through the lower end of a rocking or tilting member, $I^1$, which bears on the front axle, B. Immediately at the front of the member, I, nuts, $I^2$, are threaded on said eye bolt. The upper end of the member, $I^1$, extends into a stirrup, $I^3$, which permits endwise or horizontal sliding or slipping of said rocking member relative to the chassis. During upward rebound of the rear end of the chassis, the tension member, $F^1$, is pulled upward, whereby rearward strain is applied on the eye bolt, I, whereby force is exerted on the lower end of the member, $I^1$, tending to tilt the same on the axle, B, whereby the rear and upper end of said member, I, presses upward and tends to lift the forward part of the chassis, whereby the weight and inertia of the forward part of the chassis and the forward part of the automobile body tend to resist the upward rebound of the rear part of the automobile body. Variation in the relation between the two ends of the automobile body may be made by shifting the nuts, $I^2$, on the eye bolt, I.

In Fig. 12, the meeting ends of the toggles have holes for changing the coupling at those ends.

Since in usual practice the greater part of the automobile load rests on the rear springs, the control of rebound of the rear part of the chassis and automobile body is of dominating importance.

Characteristics of my improved mechanism may be noted as follows:—

(1) Movement of the rear end of the automobile body above normal position causes raising of the front end of said body above its normal position.

(2) The rear end of the body may fall below normal position without having any effect on the front end other than releasing tension on the tension member.

(3) The front end of the body can go above its normal position without exerting any effect on the rear end of the body.

(4) When the front wheels meet an obstruction, the front end of the body can not move downward without pulling the rear end down. Such downward movement will be resisted by the inertia of the rear end.

(5) Both the front and the rear ends of the body can move downward in unison below their normal positions without any action being exerted by my control mechanism upon either end, provided the angles of the mechanism are the same at the front and at the rear.

(6) The relation of the mechanism to the two ends of the body may be adjusted with reference to the needs of the rear part of the body, so that while loads are varied, the rebound control will be practically uniform.

(7) The use of flexible straps, ropes or chains to form the tension member makes possible applying the mechanism without interference with the engine, brake rigging, and other automobile parts, the tension member being deflected over or under said parts, whereby the mechanism is adapted to easy installation on any standard automobile.

(8) By lengthening the toggles relative to the rear connection when the car is loaded approximately evenly, a limited downward movement of the front end of the car will throw forward the apex or angle of the toggle fast enough to compensate for the greater compression at the rear, whereby the tension member connecting the two front and rear folding members is kept under tension. By varying the length of the toggle more or less, the tension of the tension member at different stages of the operation may be varied.

(9) Variation of the length of the toggle relative to the rear connection will vary the resistance offered by the front end of the automobile body to upward movement of the rear part of the body above normal position.

(10) The resistance to rebound of the rear of the body above its normal position prevents building up or accumulating a vibration force tending toward a strong vibration between points above and below the normal position. Such vibration force tends to build up when the road surface has frequent irregularities adapted to time approximately with the compression and expansion of the rear springs of the automobile.

(11) The mechanism is simple and may be constructed and installed at moderate cost.

I claim as my invention,

1. The combination with a vehicle chassis, of chassis lifting means supported by the front axle and engaging the forward end of the chassis, tension means engaging the rear axle and the rear part of the chassis and in operative relation with said lifting means to actuate the lifting means to apply upward force to the front part of the chassis when the rear end of the chassis is in upward motion above its normal position.

2. The combination with a vehicle chassis, of chassis lifting means supported by the front axle and engaging the forward end of the chassis, tension means engaging the rear axle and the rear part of the chassis and in operative relation with said lifting means for pulling said lifting means to actuate the lifting means to apply upward force to the front part of the chassis when the rear end of the chassis is in upward motion above its normal position.

3. The combination with a vehicle chassis and a front axle and a rear axle, of rocking means connected with the front part of the chassis and the front axle, and tension means in operative relation with said rocking means and the rear part of the chassis and the rear axle for pulling the tension means to actuate said rocking means for lifting the front part of said chassis while the rear part of the chassis is in upward motion above its normal position.

4. The combination with a vehicle chassis and a front axle and a rear axle, of rocking means connected with the front part of the chassis and the front axle, and cushioned tension means in operative relation with said rocking means and the rear part of said chassis and the rear axle for pulling the tension means to actuate said rocking means for lifting the front part of said chassis while the rear part of the chassis is in upward motion above its normal position.

5. The combination with a vehicle chassis and a front axle and a rear axle, of a toggle structure connected with the front axle and the front part of the chassis, and tension means in operative relation with said toggle and the rear part of said chassis and the rear axle for straightening the toggle when the rear part of the chassis is in upward motion above its normal position.

6. The combination with a chassis and a front axle and a rear axle, of a toggle structure connected with the front axle and the front part of the chassis, and cushioned tension means in operative relation with said rocking means and the rear part of said chassis and the rear axle for pulling the tension means to actuate said rocking means for lifting the front part of said chassis while the rear part of the chassis is in upward motion above its normal position.

7. The combination with a vehicle chassis and a front axle and a rear axle, of a forward-directed toggle structure hinged to the forward axle and the front part of the chassis, and tension means joined to the toggle between its hinge to the front axle and its hinge to the chassis and said tension means being in operative relation with the rear axle and the rear part of said chassis for straightening the toggle when the rear part of the chassis is in upward motion above its normal position.

In testimony whereof I have signed my name, this 30th day of June, in the year one thousand nine hundred and twenty-four.

HUGH W. SANFORD.